(12) United States Patent
Smeets (10) Patent No.: US 7,066,858 B2
(45) Date of Patent: *Jun. 27, 2006

(54) BELT

(75) Inventor: Paulus Maria Smeets, Tilburg (NL)

(73) Assignee: Van Doorne's Transmissie B.V., Tilburg (NL)

( * ) Notice: Subject to any disclaimer, the term of this patent is extended or adjusted under 35 U.S.C. 154(b) by 231 days.

This patent is subject to a terminal disclaimer.

(21) Appl. No.: 10/451,665

(22) PCT Filed: Dec. 19, 2001

(86) PCT No.: PCT/EP01/15050

§ 371 (c)(1),
(2), (4) Date: Jun. 25, 2003

(87) PCT Pub. No.: WO02/053939

PCT Pub. Date: Jul. 11, 2002

(65) Prior Publication Data

US 2004/0053723 A1    Mar. 18, 2004

(30) Foreign Application Priority Data

Dec. 28, 2000  (EP) ................................... 00204816

(51) Int. Cl.
*F16G 5/16*    (2006.01)
*F16G 5/22*    (2006.01)

(52) U.S. Cl. ...................................... 474/242; 474/201

(58) Field of Classification Search ............... 474/240, 474/242, 244–246, 201, 170, 265, 272
See application file for complete search history.

(56) References Cited

U.S. PATENT DOCUMENTS 3,720,113 A * 3/1973 Van Doorne et al. ....... 474/242

(Continued)

FOREIGN PATENT DOCUMENTS

EP        0 014 013        8/1980

(Continued)

OTHER PUBLICATIONS

Patent Abstracts of Japan vol. 007, No. 102 (M-211), Apr. 30, 1983 & JP 58 024640 A (Nissan Jidosha KK), Feb. 14, 1983 abstract.

*Primary Examiner*—Marcus Charles
(74) *Attorney, Agent, or Firm*—Young & Thompson (57) ABSTRACT

Belt for a continuous variable transmission, comprises an endless carrier for taking up tensile forces, and a plurality of transverse elements moveable in the longitudinal direction along the carrier. The elements are provided with at least one saddle surface for contacting the carrier. The saddle surface defines an ultimate mutual position of the carrier and the elements relative to each other within the belt in radial direction, with a tapered lower part including a rocking edge and an upper part extending radially above the edge and beyond the carrier, when the carrier and surface are in mutual contact. A thickness of the upper part of a majority of the elements in the longitudinal direction is larger than a largest thickness of the tapered lower part, such that an array of elements pushed against one another within the belt when mutually contacting through their upper parts assumes an arc-like shape.

13 Claims, 5 Drawing Sheets

U.S. PATENT DOCUMENTS

| | | | |
|---|---|---|---|
| 4,281,483 A | | 8/1981 | Horowitz et al. |
| 4,465,469 A | * | 8/1984 | Cataldo ....................... 474/201 |
| 4,595,385 A | * | 6/1986 | Henderson .................. 474/201 |
| 4,698,050 A | * | 10/1987 | Hattori et al. .............. 474/242 |
| 5,019,020 A | * | 5/1991 | van Lith ..................... 474/240 |
| 5,123,879 A | * | 6/1992 | Lecouturier et al. ........ 474/242 |
| 5,180,345 A | | 1/1993 | Van Der Zande |
| 6,306,055 B1 | * | 10/2001 | Serkh ......................... 474/242 |

FOREIGN PATENT DOCUMENTS

| | | | |
|---|---|---|---|
| EP | 0 421 804 | | 4/1991 |
| EP | 0 962 679 | | 12/1999 |
| EP | 0 976 949 | | 2/2000 |
| EP | 1 018 608 | | 7/2000 |
| EP | 1 069 343 | | 1/2001 |
| JP | (62-353136 A | * | 2/1987 |
| JP | (01-98733 A | * | 4/1989 |

* cited by examiner

BELT

BACKGROUND OF THE INVENTION

The present invention relates to a belt for a continuously variable transmission.

DESCRIPTION OF THE RELATED ART

Such a belt, generally known as a "push belt" and in this particular design alternatively denoted single package push belt, is generally known from a plurality of publications. One early publication of a so called single package belt is U.S. Pat. No. 3,720,113. The single package push belt is highly desired for practical application compared to a double package belt as known from later publications like EP-A 0000802, but suffers from costly technical measures at providing separate retaining means to keep the carrier and transverse elements of the belt as a whole, in other words to prevent the elements from falling apart from the carrier and to maintain its structural coherence. This maintaining of the integrity of the belt particularly is an issue while the belt is in operation, but is also a consideration at simply maintaining the integrity of a belt assembly.

The prior art shows several ways of solving the above mentioned problem. In particular, several types of carrier receiving recesses of the transverse element are shown. Amongst these are the provision of one or more axially extending slots, the provision of element parts for hooking the carrier, and the provision of retaining means for locking the carrier receiving recess means such as closure pins.

In the belt disclosed by the US publication, radially extending limb parts of the element are bent axially inwardly with respect to the recess, thereby creating a hook like part, so that the carrier, in addition to it being surrounded along its lateral and its radial inner sides, is at least partly surrounded along its radial outer side too. This construction of hooking of the carrier by the transverse element, is favourable for it's relatively low weight. However, the construction suffers from manufacturing difficulties in that the inward bending of the transverse element provides for a relatively complicated blanking shape and in that at assembly specific effort is required to insert the carrier in the desired position relative to the transverse elements. In particular, the carrier can not be inserted freely, i.e. without deformation thereof. Such deformation may be an initiator of carrier breakage when under severe tensile load during operation. Another construction of such kind is disclosed in EP-A 0095257, where the carrier is relatively tightly hooked into a contacting position with the element.

A construction, which overcomes the latter insertion problem, is known from EP-A 0135237. In this known construction an element shows a so called slot, being a laterally oriented recess in the element having an opening towards an upper corner of the element. At least part of the radial outer side of the carrier is contacted by a radial outer, or upper element part, and the elements are to be inserted in an alternating sequence. Belts comprising such elements come with a relatively high weight, thus limiting the performance in terms of transmittable torque. Also the alternating sequence requirement brings along a manufacturing complication in that the elements have to be assembled into the belt alternatingly positioned, i.e. mirrored about the longitudinal direction of the belt.

An alike earlier construction showing a favourably more simple slot construction is known from EP-A 0073962. This document discloses elements with a more or less straight slot having an opening towards an axial side of the element. For preventing the risk of the carrier coming into contact with a pulley face while the belt is in operation, also with this construction the elements have to be fitted mirrored. The complication of mirrored adjacent elements is suggested to be overcome by producing the lower, tapered element part with a two sided tapering so that, expectedly at the expense of some production difficulty and cost, only one element orientation need be applied.

Another known single package design shows a separate element type for maintaining belt integrity at operation of the belt. Such element type is provided with a retaining means in the from of a locking means, e.g. a pin or a locking ring, closing of the carrier receiving recess after assembly thereof. Such a construction may render a secured integrity of the belt, both in operation and as a separate part, but is relatively unfavourable due to weight and manufacturing cost, while the robustness in many designs can not be guaranteed when somewhat larger torque levels are to be transmitted, such as e.g. typically required for automotive application. Of this belt design, one such pin construction is disclosed in EP-A 0122064, and one such ring construction is disclosed in U.S. Pat. No. 5,123,880.

BRIEF SUMMARY OF THE INVENTION

The present invention principally, but not exclusively, aims at realising a single package belt design without above mentioned cost raising disadvantages, which is composed of only a single element type, which has a relatively uncomplicated shape and a relatively low weight so as to maximise the amount of torque transmittable by the belt. A belt comprising may be produced easily since in principle no carrier retaining means is required during operation. Surprisingly, the function of the retaining means of maintaining belt integrity is achieved by thickening the upper element part relative to the thickness of the element at the location of it's rocking edge, i.e. the largest thickness of the lower element part. In this way a so called cat's back-like arc (defined below) is achieved in the pushing part of a belt as arranged between two pulleys. Then the elements do not fall apart from each other or from the carrier, since they are wedged in their position when observed from side elevation. Favourably, only one type of element is required with this solution, thus guaranteeing a favourable production and assembly. Moreover, unlike the known belt designs, belts with this type of element may be produced with a variety of carrier embodiments for covering a variety of applications differing in torque transmitting capacity and/or other transmission characteristics. The element may be kept relatively low in weight due to a lack of material over the width of an element at the radially outer side of the intended position for the carrier. Also, it was found that the current design feature may favourably be applied to both single package and double package belt designs.

According to the invention the current design feature might favourably be applied to the double package belt designs, because for this design the invention enables different element shapes to be applied with respect to the known art. In particular the transverse width of the T-shaped upper element part may be reduced, since it no longer serves to limit the radial play between carrier and element. Moreover, the feature aids in securing or optimising the belt's functional life time, because the carrier is loaded less during operation of the belt. There e.g. no longer needs to be an interaction between the radial outer side of carrier and the element, which in the belt according to the known art occurs at the location where the elements exit a pulley. In this area, due to elastic deformation of the pulley, the elements are clamped between the sheaves of the pulley very effectively such that they tend to keep rotating along with the pulley. In the known belt, the elements are pulled away from the pulley sheaves by the carrier interacting with the retaining means, such as the T-shaped upper element part or the locking pin, putting an additional load on those components. In the belt according to the invention, the elements of the belt are kept firmly in contact also in the slack trajectory part, so that a force for pulling the elements away from the pulley may be transmitted from one element to the other.

Surprisingly the measure according to the invention realises the integrity of the belt while obviating the application of the previously described means for the integrity of the belt by positively or directly limiting the relative radial movement between transverse element and carrier. This provides the possibility of applying a recess that is entirely open in radially outward direction, i.e. with even leaving out carrier hooking parts or locking means. For achieving this effect, according to the invention only a small but noticeable amount of tapering is required at the upper element part radially beyond the rocking edge. In this way favourable advantage is taken of the circumstances that a belt incorporates a significantly large number of transverse elements and that in this type of belt a pushing force is exerted between elements.

It is here remarked that in the context of the current description the height of the element is assumed to concur with the dimension of the belt in the radial direction when positioned in a circular shape, the width of the element concurs with the dimension of the belt in the transverse or axial direction and the thickness of the element concurs to its dimension in the belt's longitudinal direction, i.e. along the circumference of the belt.

In a favourable embodiment of the invention the upper element part gradually increases in thickness. In this way the wedging effect is achieved over a considerable if not maximum distance on the element thus, optimising the security of the wedging effect by lowering the contact pressure between elements.

More favourably, the tapering of the upper element part is achieved with one longitudinally facing side of the element forming a flat plane covering both a substantial part of the lower element part and of the upper element part. In this way the problem of technical and economical manufacturing of the element is favourably solved, e.g. only one longitudinally facing side of element is profiled favourably allowing element production by means of blanking.

A particularly favourable and secure effect may according to the invention be achieved when a nominal difference in thickness of the belt's elements between the upper element part and the lower element part at the level of the rocking edge is between 0.01 and 0.20, preferably about 0.04 times the thickness at the rocking edge.

The described problem of maintaining the integrity of a so called single package belt is according to the invention alternatively solved by a feature which is here incorporated in addition to the preceding solution, but which may also be applied exclusively. This feature entails that by an adaptation of a critical radial height of the upper element part of the elements in relation to a circumference length of the belt an amount of play present between the transverse elements is removed, at least would be when mounted and run in a transmission by mutual contact between the upper element parts of at least two transverse elements in a concavely shaped slack trajectory part of the belt in between the pulleys. According to the invention such feature aids in keeping the elements mutually in stable contact, thereby maintain the integrity of the belt during operation. This latter solution is based on the insight that at the slack in between pulleys part of the belt's trajectory when applied in a transmission, the elements may block one another in a stable end position in which the relevant belt part is concavely shaped. The solution takes account of the experience and insight that such slack trajectory part has a tendency to buckle radially inward as a result of a clamping action on the belt by the pulleys, which tends to counteract the belt exiting the pulleys and urging the belt to continue to rotate in the pulley.

With this solution large values of a total end play, being the summation of the longitudinal play between the elements of the belt, may be allowed thus favouring the assembly of the belt, provided the element height above the rocking edge is made sufficiently large. The invention hereby among others may take advantage of the insight according to which only a part of a belt's total end play is present in the slack trajectory part at any time. Moreover, the end play in this slack trajectory part will generally not be concentrated between two adjacent elements, but tends to be more or less distributed. Accordingly, the element height need only be dimensioned, for the largest gap, i.e. play, that may be expected to occur during operation between two adjacent elements, which may for instance be established in practice. In a further elaboration of this principal solution, the adaptation departs from the square root of the belt's circumference length, being defined as the length of the radially inner periphery of the carrier. A special advantage of the solution according to the invention is that it not only takes account of the actual end play of the belt when in a free state, i.e. circularly shaped that is possible outside the transmission, e.g. after assembly, but that it also covers the situation where the total end play is partly determined by elastic deformation of carrier and elements during operation or becomes larger still, due to it's mounting and operation within a transmission.

More in particular, the invention relates to a so called single package belt in which the upper element part is provided with limbs extending in a direction to the radial outside from the rocking edge, each limb being provided near a lateral side portion of the element adjoining an axial end of the carrier contacting face, alternatively denoted saddle surface or simply saddle, and defining a lateral boundary of the recess. Unlike the known belt designs, this type of belt may readily be produced with a variety of carriers dimensions for covering a variety of applications, e.g. differing in torque transmitting capacity. The element type described may be kept relatively low weight, because of a lack of material over a large part of the width of the carrier in the upper element part.

According to another specific aspect of the invention, each such limb is provided with a predominantly longitudinally oriented protrusion, here denoted protrusion, at a level above the radial outer side of the carrier when in contacted with the element through the saddle surface. In this structure, the protrusion promotes the maintaining of the integrity of the belt particularly at the slack trajectory part, while allowing a relatively large total end play. When the belt at such slack trajectory part is bent towards the centre of the belt, i.e. concavely bent, the elements tend to mutually contact through radially outer parts thereof. Providing the protrusion close to, or even at these outer part is according to the invention intended to prevent the elements to move relative to each other in the radial direction, and therefore prevents the single package belt from disintegrating. This function of the protrusion is not found in known belt arrangements, where it instead has a function at the in between pulleys trajectory part of preventing elements from vibrating axially and at arc-shaped pulley trajectory parts of the belt of supporting a stable mutual orientation of the elements, and, accordingly, requires a different positioning of the protrusion in accordance with the invention. Since this new function and new positioning of the protrusion in it self enables, at least enhances, an adequate functioning of the single package belt design, the invention also relates to a belt in which a limb is provided with a predominantly longitudinally oriented protrusion at a level radially outward from the carrier when in contacted with the element through the saddle surface.

In such new arrangement, preferably the protrusion is located entirely in an upper half of the radial dimension of the limbs. In a favourable embodiment the protrusion has a predominantly axially extending lower surface forming a radially inner boundary of the protrusion, thereby enhancing both the protrusion's function of preventing radial displacement between adjacent elements at an in between pulleys trajectory part, as well as the manufacturability of the element. As in the known art, with the protrusion arrangement according to the invention being located on a longitudinally facing surface of the limb, a corresponding hole is provided in a surface of the limb facing in an opposite direction. For optimally securing the functionality of the new protrusion arrangement, the invention prefers an arrangement wherein the protrusion is produced partly as a part of the limb that extends in a longitudinally forward and a radially outward direction. In this manner the protrusion is realised while maintaining the elements thickness over the entire radial length of the upper element part, thereby enabling the elements to take up a considerable pushing force in a straight part of the belts trajectory. In this new design the protrusion is preferably produced by bending the limb, rather than by shearing of material to simultaneously form the protrusion and the hole as is the preferred method for forming known protrusion embodiments. Yet a further favourable aspect of this new protrusion design is that it may be partly formed by a limb part extending both in radial and in longitudinal direction adjoining a limb part located to the radial outside therefrom and extending in radial direction parallel to a limb part radially below the limb part. Such structure may favourably be produced while maintaining the new functionality of the protrusion part.

Yet a further specific aspect of the single package design according to the current invention shows the limbs having end parts in radially outward direction to comprise a section of axial limb width that is increased relative to a limb section near the level of the saddle surface. In this manner a good, i.e. stable and reliable mutual contact of elements, particularly in the slack trajectory part is promoted, thereby enhancing the application of the belt type without the retaining means or, more specifically, of the belt type wherein the transverse width carrier receiving recess of the elements would allow movement into or out of the recess of the carrier without deformation thereof. In a preferred embodiment of this aspect of the invention the section of increased limb width is located at least for a major part thereof radially outward from the protrusion, more preferably directly adjoining or including a top side or radially facing end face of the limb, thereby minimising the chance of failure in mutual contacting of the limbs, particularly since in accordance with the invention the limbs are otherwise sought to be of minimal width.

In an embodiment favourably to be produced, the fore mentioned section of increased limb width is formed through an axial side of the limb extending according to a straight line as viewed in the longitudinal direction of the belt, preferably extending substantially radially. In such embodiment the top side of the limb preferably may be provided with a flat surface extending predominantly axially and longitudinally, which surface merges with axial sides of the limb by a rounded transition section, preferably of a radius of approximately 1 mm.

So as to optimise the good functioning of a single package belt in which the carrier receiving recess would allow free mutual movement of carrier and element, the limbs in longitudinal view extend radially and axially under an angle at least substantially conforming to an angle at which both pulley contact faces of the element and element contact faces of the pulley are oriented, the so called flank angle, at least for a predominant part of the height of the limbs. By this measure the limbs in fact are produced to be axially separate, preferably as much as possible within the confinement of a V-shaped groove defined by the pulley, thereby promoting the stability of the belt in respect of torsion and axial buckling thereof. To which phenomena the belt, especially of the invented kind may be subject to at parts of the belt trajectory in between the pulleys. In a preferred embodiment of this latter element design provided with the protrusion according to the invention, a predominant part of an axially outward facing surface of the protrusion is also oriented at an angle at least substantially conforming to the flank angle. Moreover, a predominant part of an axially inward facing surface, i.e. a surface facing the same surface of the protrusion provided on an opposite limb, may also be oriented at an angle at least substantially conforming to the flank angle, to minimise the dimensions and mass of the protrusion, while optimising element stability.

In accordance with the preceding features of the invention, a favoured embodiment of the element is found in that a mutual separation of the axially inward facing surface of the limbs facing the carrier receiving recess is larger than an axial width of the carrier.

While securing the functionality of a single package belt, the invention seeks to reduce its weight, thereby optimising a torque transferring capability of the belt. Thus irrespective of any of the measures and features described in the above, the invention seeks to keep a nominal axial width of a limb small in relation to the width of the carrier. In this respect, according to the invention the sum of the axial widths of the limbs at a radial level corresponding to that of the saddle surface is less than one third, preferably less than one sixth, of an axial width of such surface, while the recess for receiving the carrier is directed radially outward and opens to the radial outside over a width that at least conforms to the axial width of the carrier. In this optimised design, the radial length of the limbs is favoured to surpass by at least three times the thickness of the element at the level of the saddle surface when departing from the radial level of the saddle surface. By such measure, there is no need for the limb being provided with a hook shaped end part for obstructing the element from separating from carrier in the radial direction, that is without a simultaneous mutual rotation of element and carrier, or, in case of a double package belt, the upper element being T-shaped, such that free insertion of the carrier in the recess is possible even when the carrier is oriented parallel to the axial direction. Thus the limbs, or alternatively the upper element part, can be produced having a relatively small axial width, thereby optimising the ratio between carrier width, i.e. the width determining the torque transferring capability and the total width of the belt. Preferably the limb width substantially conforms to the element thickness at the level of the saddle surface face, the limbs than having a square cross section at the level as seen in a direction along the length of the limb.

In a preferred embodiment, favourable individual and in combination with the respective features according to the invention, the elements show a axially extending rocking edge, alternatively and more accurately denoted a tilting zone because usually it is not a sharp edge but a more or less smoothly curved surface in the form of a radially oriented convex curvature that extends over a substantial part of the width of the element. The rocking edge or tilting zone is preferably located at a distance between 0.4 mm to 0.6 mm radially inward from the saddle surface. In this manner relatively large contacting pressures may be received between elements within the belt, while the rocking edge is located close to the saddle surface to minimise speed differences within the belt between carrier and elements during operation.

A particularly important aspect of the invention relates to a belt design wherein the transverse element at each lateral end thereto is provided with a side surface in the form of a pulley contact face, alternatively denoted flank, for contacting the pulley. The flanks extend in radial direction beyond the upper boundary of the carrier at least when in contact with the saddle surface. In this manner a contact pressure between the element and the pulley may be significantly reduced. Although from theoretical considerations it may be taken that an element may correctly receive the clamping force of a pulley by a flank having a smaller radial height, a large flank is favourable both for a stability of the orientation of the element with respect to the pulley and for maintaining favourable lubricating conditions there between. It is observed that a theoretically allowable contact pressure may not be allowable after all due to disintegration of a lubrication medium as a result of the amount of heat being generated in the frictional contact between element and pulley. In extreme cases this heat may cause local micro welding spots between pulley and element, severely reducing belt service life.

In a preferred embodiment the flank extends for at least one third, however, preferably not more than about half of its radial height above the rocking edge, thereby also improving the elements stability within a pulley, because an effective radial level of application of the friction force between element and pulley is then brought to, or at least close to the radial level of the rocking edge where the pushing force between adjacent elements is transmitted. In this manner, a force moment, of the forces is minimised, whereby the tendency of the elements to tilt about an axial of the belt while in the pulley is minimised. In this respect, the radius of the axially extending curvature that forms the rocking edge is about 12 mm or even larger. Preferably, the radius falls within the range of values defined at a minimum by the radial height of the flank and at a maximum by the nominal element width. This range was found to be particularly suitable in the context of the single package belt design as defined by the features of the present invention.

Yet another particular aspect of the invention relates to a belt design in which the lower side of the endless element is shaped with a radially inner edge that is shaped concave, whereby the inner edge extends in axial direction at least over the width of the saddle surface. Although the feature of a concave inner edge is known from a double package belt design, it has never been applied in a commercial belt design. Apart from rendering a novel structure, application thereof in the single package belt design, however, favourably increases flank height while keeping the total volume and weight of the lower element part down. In a preferred embodiment, the inner edge is curved at least virtually in agreement with a radius having a value within the range from 0.5 to 1 times the largest transverse width of the lower element part. This range was found to be particularly suitable in the context of the single package belt design as defined by the features of the present invention.

In a favourable elaboration of the latter aspect of the invention, the lower element part may be provided with an axially extending step in the longitudinal direction, such that at such location the thickness of the element changes stepwise. In this manner the weight of the element may be kept down further. According to the invention the step is provided close to the inner edge of the element, preferably intersecting it in at least one location. This design feature has a positive effect on the accuracy of the blanking process for element manufacture and, moreover, reduces the force to be applied during blanking. According to a preferred embodiment of the invention, radially below the step the element has a thickness in the range from 0.75 to 0.90 times the largest longitudinal thickness of the lower element part. Such range providing the optimum balance between element strength for taking up the clamping force and weight reduction as aimed at by the present invention.

Finally, the belt features a favourable design aspect wherein axial ends of the saddle surface smoothly merge with the limbs through small protrusions, whereby the protrusions are shaped predominantly arc-like. In this manner the transition between limbs and saddle surface is less prone to cracking. Moreover, with such design the flank may extend up to a considerable level above the radial level of the saddle surface, while the clamping force at the upper flank portion may still be favourably guided into the lower element part. In an optimised embodiment in this respect, a virtual continuation of the arc like protrusion aligns with the surface of the limbs facing the carrier receiving recess.

The above proposed embodiments and aspects of the invention, either individual or in combination most favourably operate in combination with a carrier composed of a set of radially nested endless flat metal bands that are relatively thin.

BRIEF DESCRIPTION OF THE DRAWINGS

With the above and other objects in view, which will become apparent from the detailed description below, preferred embodiments of flexible belt type transmission means according to the invention are shown in the accompanying drawings, in which:

FIG. 11 is an upper portion of an alternative element embodiment, represented in a view according to the side elevation in FIG. 6a;

FIG. 12 is an upper portion of a second alternative element embodiment, represented in a view according to the side elevation in FIG. 6a;

DESCRIPTION OF THE PREFERRED EMBODIMENTS

In the drawings structural portions performing corresponding functions are referred to by same reference numbers. The figures are described more in detail in the following.

Figure 1:
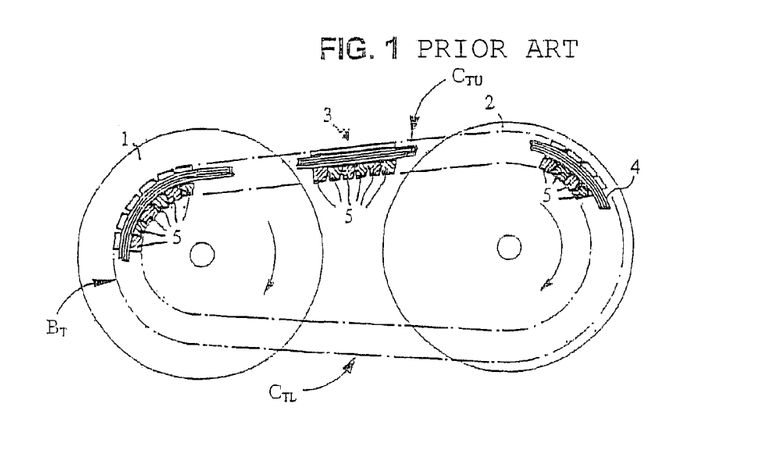
FIG. 1 is a diagrammatic elevation in section of a known belt type transmission means.

FIG. 1 schematically shows a belt type transmission means, also denoted a continuously variable transmission (CVT), adapted for automotive application, but suitable for other applications like e.g. windmills, with a belt 3, running between pulleys 1 and 2 while resting against sheaves thereof. The sheaves of a pulley 1, 2 define a V-shaped groove for receiving generally V-shaped pulley contact faces 15 and 16, also denoted flank 15 and 16 of the belt 3. The belt 3 conveys a force from one pulley 1, 2 to the other, which force emanates from a torque loaded onto such one pulley 1, 2 e.g. by an engine of a vehicle. The belt 3 is depicted in a position near a so called LOW position, comparable to the first gear position in manual transmissions. The belt 3, alternatively denoted push belt 3, comprises a carrier 4, alternatively denoted support 4 or tensile means 4, in the form of a set of nested endless thin metal bands 7, otherwise denoted rings 7, and a multitude of separate transverse elements 5, otherwise denoted blocks 5. The elements 5 are arranged freely slidably along the carrier 4 in an endless, virtually continuous array, thus guaranteeing the belt 3 to be able to function as a so called push belt 3, i.e. a belt 3 for transmitting force from one pulley to the other at least partly via a pushing force within the array of transverse elements 5 pushing adjacent elements 5 against one another between the two pulleys 1 and 2.

For operational application the belt 3 may run between the sheaves at any radial distance from a pulley's shaft, thus creating a steplessly variable transmission ratio. For clamping the belt 3 between the sheaves and for varying the running radius of the belt 3, at least one sheave of each respective pulley 1, 2 is provided axially displaceable in a known manner, e.g. by hydraulic control means applying a force on the at least one sheave, sufficient for transmitting the torque or for shifting the running radius of the belt 3 in the respective pulley 1, 2.

As illustrated in the figures, the elements 5 of a belt 3 are provided with inclined pulley contact faces 15 and 16, alternatively denoted flanks 15 and 16 for contacting the sheaves of the pulleys 1 and 2. When clamped sufficiently strong between the sheaves of a pulley 1, 2, the belt 3 is capable of transmitting force from one rotating pulley 1, 2 to the other after such force has been transmitted to the belt 3 by way of friction between the flanks 15 and 16 and V-faces of the respective sheaves. The V-shaped groove defined by the sheaves of the pulleys 1 and 2 has a V-angle that at least virtually matches the angle at which the inclined flanks 15 and 16 of the element 5 are oriented, the so called flank angle. The flanks 15 and 16 may be roughened by the provision of rills and grooves, so as to allow adequate presence of a cooling medium such as transmission oil, in the contact between element 5 and pulley 1, 2. The elements 5, as seen in cross section preferably have a lower element part, which includes parts of the element 5 located radially inward from the level of a rocking edge 9 and the rocking edge 9 itself. An upper element part then is defined as parts of the element 5 located radially outward, i.e. above the rocking edge 9. The rocking edge 9 is alternatively denoted a tilting zone 9 and comprises a curvature in radial direction that commonly has a radius of around 6 to 12 mm and holds a theoretical multiplicity of axially oriented contact lines along which the elements 5 may mutually contact and rock, e.g. while in an arc-like bent trajectory $B_T$ between the sheaves of a pulley 1, 2.

Figure 3:
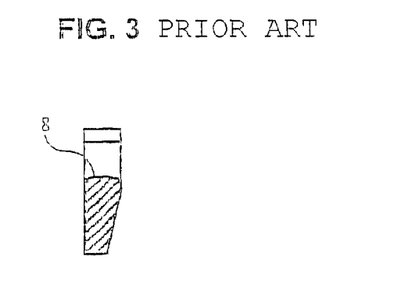
FIG. 3 depicts section III—III in FIG. 2.

At least an inclined face 19 of the lower element part, i.e. a side face in the elevation of FIG. 3, is inclined relative to the upper element part at the same side of the element 5, so that the element 5 becomes thinner towards it's radial inner side, i.e. the side directed to the inner side of the belt 3. The elements 5 further are provided with generally slightly convex shaped and radially outward facing carrier contact face 8. The carrier contact face 8, alternatively denoted saddle 8, is intended for contacting the carrier 4 during operation of the belt 3, in particular the radially innermost band thereof. Such saddle surface 8 is generally also shaped convex as seen in side elevation at least for a part thereof intended to contact the carrier 4.

In operation parts of the belt 3, through the rotation of a driving pulley passes a so called crossing trajectory $C_{TU}$, $C_{TL}$ alternatively denoted an "in-between pulleys trajectory parts" $C_{TU}$, $C_{TL}$ between the bent trajectories $B_T$ where the belt elements 5 are clamped in the respective pulley 1, 2 in which crossing trajectory it shows an upper and a lower part, crossing trajectory $C_{TU}$ and crossing trajectory $C_{TL}$ respectively, of predominant stretched nature. Where clamped between the sheaves of the pulleys 1 and 2 the belt 3 shows a first and a second typically arc-like bent trajectory $B_T$. At the two in-between pulleys trajectory parts $C_{TU}$, $C_{TL}$, the belt 3 is at one part, the push trajectory part, tensioned, i.e. elements 5 are stiffly pushed against one another. In such part the belt 3 performs a pushing function. At the opposite in-between pulleys trajectory part $C_{TU}$, $C_{TL}$, the slack trajectory part, the belt 3 is somewhat slackened, i.e. adjacent elements 5 may show some play, i.e. a part of the total play between the elements 5 of a belt 3 required for inserting a final element 5 at assembly, resulting from element 5 wear or from deformations in the belt 3 during operation. Such play is denoted the end play $E_P$ of the belt 3. The push trajectory part and the slack trajectory part may during operation, depending on the transmission conditions, be present at either the upper side, i.e. crossing trajectory $C_{TU}$ in FIGS. 7 and 8, or at the lower side, i.e. crossing trajectory $C_{TL}$ in FIGS. 7 and 8, of the transmission. In both crossing trajectories $C_{TU}$, $C_{TL}$ the carrier 4 serves, at least aids, to keep the elements 5 in a desired mutual orientation, and may thereby be subjected to high tensile forces. In practice the belt 3, in the push trajectory part shows a tendency to buckle due to the elements 5 pushing against each other, thereby virtually forming a metal rod between the pulleys 1 and 2 that has the tendency of splashing apart. Such tendency, however, is counteracted by the carrier 4 and in particular by a tensile force prevailing therein.

Figure 2:
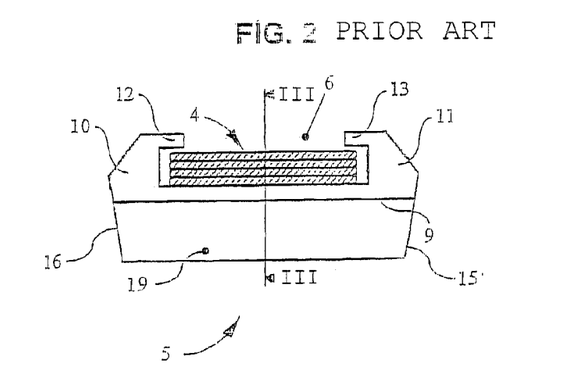
FIG. 2, on an enlarged scale, shows a front view of a prior art transverse element in a so called single package embodiment of a belt for the transmission means of FIG. 1.

In particular referring to FIGS. 2 and 3, an embodiment of a know prior art design of a transverse element 5 is schematically depicted, the description of which here serves to elucidate some basic functions and structural features of an element 5 for a belt 3, in particular a so called single package embodiment of the element 5 is depicted. Such type of element 5 has a central recess 6, alternatively denoted opening 6, for receiving a carrier 4 comprising a set of nested rings 7. The opening 6 is bounded in radially outward direction by the hook parts 12 and 13 of radially outwardly extending limbs 10 and 11. The limbs 10 and 11 each extend upwardly, i.e. radially outwardly, near a lateral side portion of the element 5, and define lateral boundaries of the recess 6. In this prior art embodiment the limbs 10 and 11 extend upwardly up to and slightly beyond the carrier 4 when it contacts the saddle surface 8 of the element 5. The hook parts 12 and 13 of the prior art limbs 10 and 11 are shaped to contain the carrier in the recess 6 once the belt 3 is assembled.

In the lower part thereof, the element 5 is provided with flanks 15 and 16, and with a tapering enabling the belt 3 to pass along the arc-shaped bent trajectory part $B_T$ in a pulley 1, 2. In the prior art embodiment, the rocking edge 9 is positioned somewhat below, i.e. radially inward from, the saddle surface 8. The tapering is realised by the inclined face 19 of the lower element part, which links up with a lower side of the rocking edge 9, being inclined downward and rearward relative to a principal plane part extending above the axially oriented rocking edge 9. The lower element part is otherwise produced as a solid essentially trapezoid shaped block with relatively high stiffness that has an essentially straight lower edge that is oriented in the axial direction.

Figure 4:
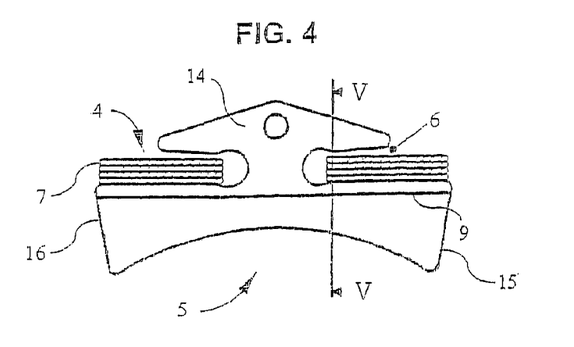
FIG. 4 is a front view of a so called dual package element embodiment according to the invention.
Figure 5:
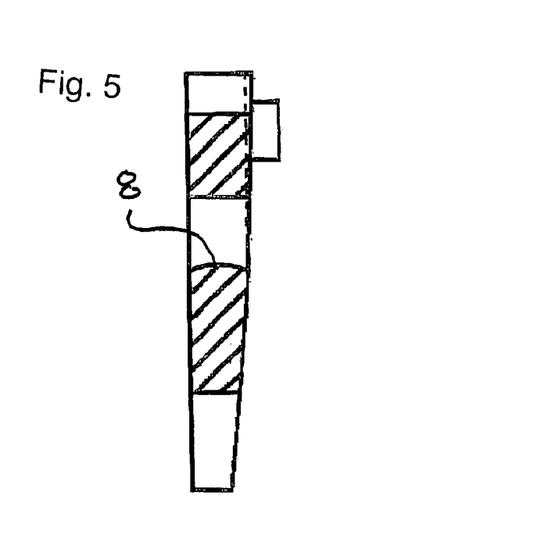
FIG. 5 depicts section V—V in FIG. 4.
Figure 7:
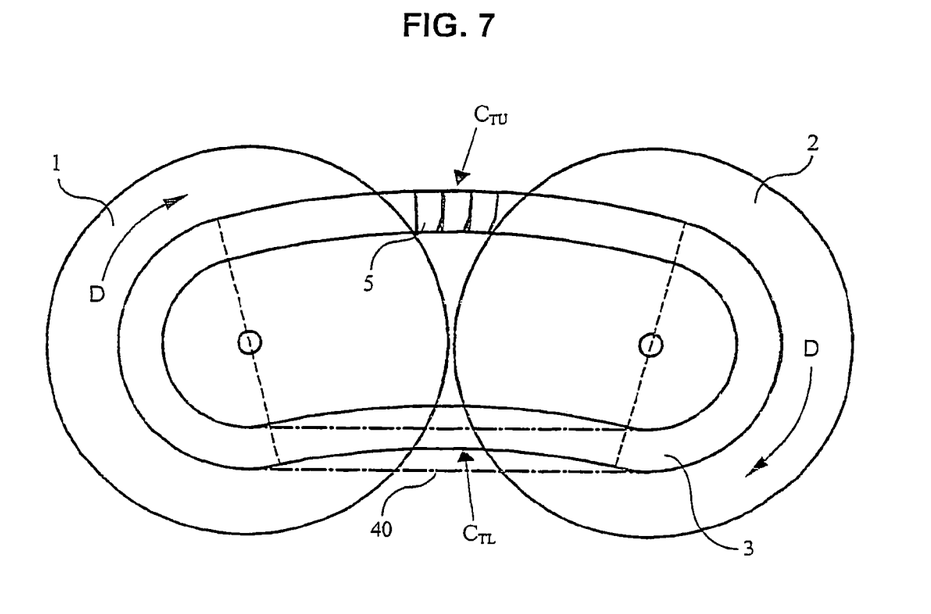
FIG. 7, in an elevation according to FIG. 1, schematically depicts the effect of an element design according to the invention.

FIGS. 4 and 5 depict an embodiment according to the invention which defines a belt 3 in particular adapted for application in a personal vehicle, containing the principal features of the embodiment according to FIGS. 2 and 3, but designed for receiving a carrier 4 in the form of two sets of rings 7, for which purpose two ring receiving recesses 6 in the form of slots 6 are provided. Each recess 6 is radially inwardly bounded by a saddle surface 8 and radially outwardly by a T-shaped upper element part 14 of the element 5. In the element 5 according to the invention, the upper element part 14, i.e. the part radially above the rocking edge 9, is slightly tapered (as illustrated by portions to the right of the dashed line) such that it has a thickest part near its radial outer end. Preferably the thickness increases in radial outward direction by an amount of increment in the order of 4% of its thickness at or near the rocking edge 9, at least for a typical number of elements 5 in a single belt 3 between 300 and 500. A useful range in this respect, however, stretches between and includes the values of 1% and 20%. In this way at one crossing trajectory $C_{TU}$, $C_{TL}$ the typical "cat's back", i.e. a convex shape of the upper, i.e. pushing, crossing trajectory $C_{TU}$ depicted in FIG. 7 is favourably attained. According to the invention this shape promotes the contact between saddle surface 8 and carrier 4 in the upper crossing trajectory $C_{TU}$ and therewith also favourably promotes the centring of the elements 5 in this part of the trajectory. The convex shape also promotes the exit of the belt 3 from a pulley 1, 2.

FIG. 7, where D denotes a direction of rotation of the respective pulley 1, 2, further illustrates with that a pulley 1, 2, due to its exertion of a clamping force on the belt 3, tends to keep the elements 5 of the belt 3 clamped between its sheaves, i.e. to inhibit the exit of the belt 3 by keeping the elements 5 moving in a circular trajectory. This feature is illustrated by the slack trajectory part, here the lower crossing trajectory $C_{TL}$, particularly in comparison with the theoretical straight trajectory indicated with reference number 40. The resulting tendency of the belt 3 to assume a concave shape depends on the total amount of play between the elements 5 in the belt 3, i.e. the total end play $E_P$. Keeping this total end play $E_P$ within a strict limit as is the case in known belts 3, has a burdening effect on the manufacture of the belt 3. This may be reduced by the increased outer thickness feature, in that in the belt 3 according to the invention through the mutual contacting of the elements 5 tends to reduce the available amount of play between the elements 5. The structure according to the invention also allows a relatively large total end play $E_P$ within the produced belts 3, because the slightly increasing thickness of the elements 5 effects a reduction of available amount of play in the concavely shaped slack trajectory part too. Moreover, this reduction of play in the concavely shaped slack trajectory part simultaneously reduces the tendency of the belt 3 to buckle in such trajectory part. By this effect the belt 3 is more easily kept within an allowable amount of concave bending as defined according to the invention in relation to the imaginary spatial trajectory 40 of the belt 3 crossing entirely straight from a location of exit from one pulley 2 to a location of entrance at the other pulley 1. According to the insight underlying the present invention, it is defined that the concavely shaped slack trajectory part of belt 3 as seen in side elevation, should remain at least partly within the imaginary spatial trajectory 40, so as to avoid an extraordinary high force with the belt 3 and to realise that the carrier 4 stays within the recess 6. Although depicted in FIG. 7 with a small amount of buckling inward from the straight spatial trajectory 40, a belt 3 having the feature of the invention may easily be designed such that the concavely shaped slack trajectory part virtually coincides with the spatial straight trajectory 40.

Figure 6A:
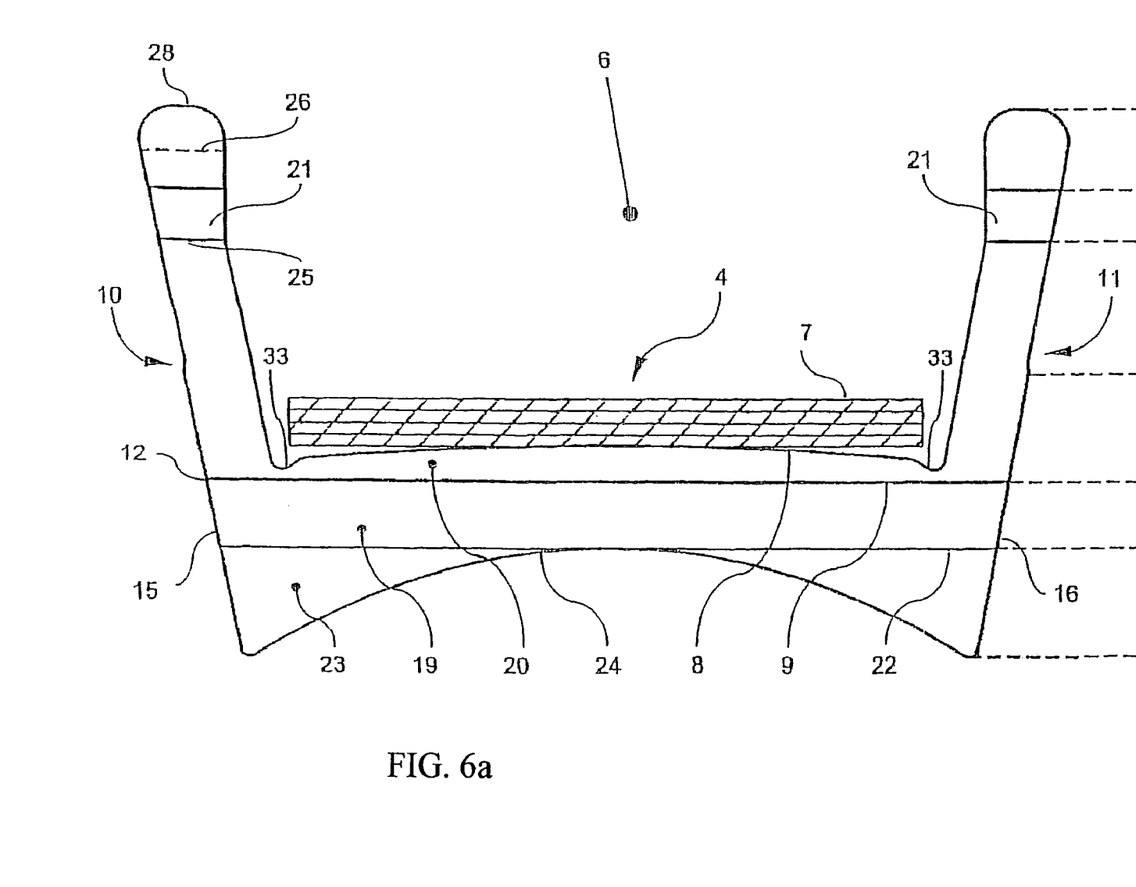
FIG. 6a is a front view of a single package element embodiment according to the invention and FIG. 6b is a side elevation connected to the front view by broken lines.
Figure 6B:
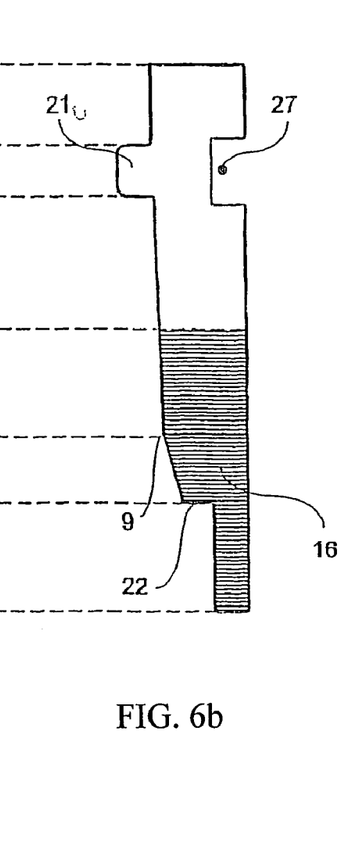

The above principle of thickening an upper element part may according to the invention favourably be applied in a single package embodiment as e.g. according to FIG. 2. In such design the feature according to the invention serves as a solution to the problem of attaining an economical and technically functional design, particularly since the feature also effects that the elements 5 in an upper crossing trajectory $C_{TL}$ are prevented from falling apart from each other or from the carrier 4, i.e. the integrity of the belt 3 is maintained. An example of such single package embodiment is provided in the structure depicted by FIGS. 6a and 6b. The side elevation part of FIG. 6b shows the preferred embodiment of the elements 5 in which the radial outward increasing thickness of an element is realised by the front face 20 of the upper element part being slightly inclined forward. Preferably, such front face 20 it located at the element's side where the rocking edge 9 and the inclined face 19 of the lower element part are provided, so that only one longitudinally facing side of the element is inclined, whereas the a further longitudinally facing face facing in the opposite direction as the front face 20 may be flat.

Figure 8:
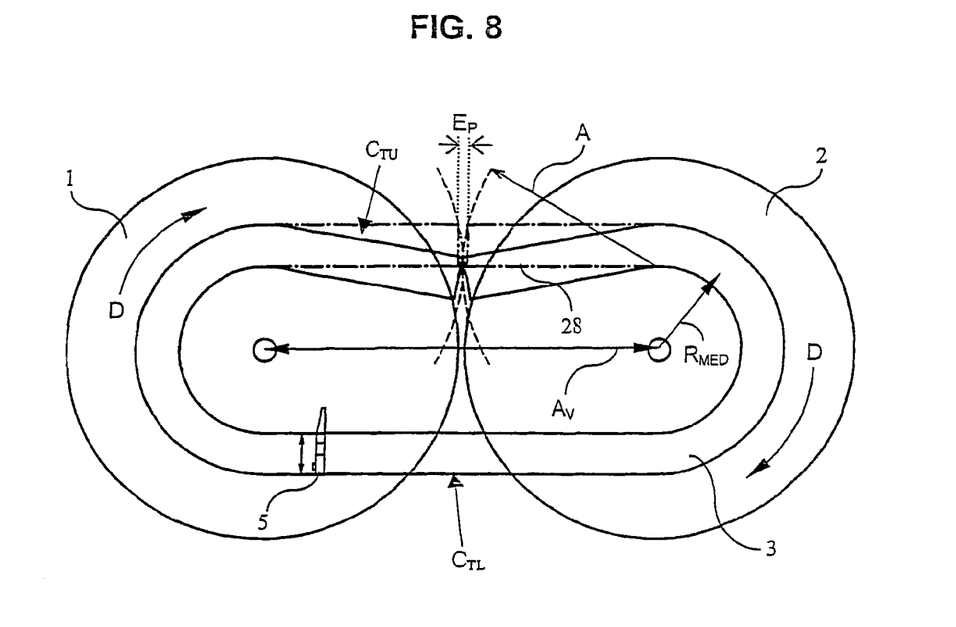
FIG. 8, in an elevation according to FIG. 1, schematically depicts the effect of an element design according to another aspect the invention when applied.

FIG. 8 elucidates the feature of a critical radial distance or height, whereby an insight in a belts geometrical features is favourably identified and applied in a new design, thereby utilising ordinary mathematical law. Differing from the representation in FIG. 7, in FIG. 8 the upper crossing trajectory $C_{TU}$ represents the slack trajectory part, where for taking into account the worst case the total end play $E_P$ is concentrated between two adjacent elements 5 that are located exactly halfway the slack trajectory part. Like in FIG. 7, the transmission is depicted with the belt 3 in Medium transmission condition, i.e. wherein a ratio of speed transfer and a ratio of torque transfer is 1. Arrow A originates at the upper side of the rocking edge 9 of an element 5 at the location of exit of the belt 3 from the relevant pulley 2. In Medium transmission condition the length of arrow A is approximately $\frac{1}{2}A_V$. Generally, it may be stated that an upper element part, which is relatively long, has the advantage that the risk of the belt to buckle, i.e. to collapse under its own tendency to bend towards its centre in the slack trajectory part, is strongly reduced. In connection with the feature explained according to FIG. 8, in fact use is according to the invention now made of an inherent possibility of the belt 3 for removing, or put alternatively compensating, correcting or absorbing, of an amount of end play $E_{PC}$. This possibility is recognised and made available by the present invention and set into effect by the measures in accordance with, at least derived from the following concept, which may be applied individually, either alternatively from the above described increased thickness solution or in addition thereto.

According to such alternative solution, the elements 5 are provided with relatively long extending limbs 10 and 11, as measured in the radial direction starting from the rocking edge 9 that are part of the upper element part. Preferably, but not necessarily this feature of the elements 5 is applied in combination with the above described increasing thickness feature of the upper element part, as shown in FIGS. 6a and 6b. In the preferred embodiment according to FIGS. 6a and 6b, the limbs 10 and 11 extend above the rocking edge 9 up to a level beyond a critical radial distance, or height $H_{SE}$, considered part of the present invention. The critical radial height $H_{SE}$ above rocking edge 9 depends on a pre-defined desired amount of end play correction $E_{PC}$. The end play correction $E_{PC}$ is only required to be a share of the total end play $E_P$ between the elements 5, when also the increased thickness solution is applied. As mentioned, such end play $E_P$, may be incorporated for facilitating manufacturing of the belt 3, may be due to elastic elongation of the carrier 4 and/or elastic compression of the elements 5 during operation, or may be due to wear of the belt 3 during operation. The invention with the critical radial height $H_{SE}$ provides that at the concave bending of the slack trajectory part, radially outer parts of the limbs 10 and 11 remain within the imaginary spatial straight part 40, so that buckling is avoided and the carrier 4 is still located within the recess 6, thereby maintaining the structural coherence of the belt 3.

According to the invention this correction or removing of end play in the slack trajectory part is also realised by the first solution, wherein the element upper part is provided with an overall tapered shape, though be it to a lesser extend. In this respect an effective thickness of an element 5 may be defined as the smallest longitudinal distance between the front face 20 of two mutually contacting elements 5. Because of the tapered shape of the upper element part, it is apparent that such effective thickness is large when the elements 5 are mutually oriented in parallel, which occurs in the slack trajectory part in between the pulleys 1, 2, and small when they are oriented at an angle conforming to the taper of the upper element part, which occurs in the pushing trajectory part or in the free state circular shape of the belt 3, at least provided that the taper is relatively small, e.g. defined by an increase in thickness over the upper element part between 0.01 and 0.2 as defined by the invention. In the first case the effective thickness is equal to the largest thickness of the upper element part and in the latter case the effective thickness is equal to the largest thickness of the lower element part. Although such difference in effective thickness is small, i.e. between 0.01 and 0.20 according to the invention, it will be present for all pairs of adjacent the elements 5 present in the slack trajectory part. This effect causes a substantial amount of the total play between the elements 5 in the belt 3 that is present after assembly, i.e. when the belt 3 may assume a circular shape, to disappear during operation. This reduces the amount of play that is to be removed by the second solution when adopted simultaneously with the first solution and accordingly reduces the critical distance $H_{SE}$.

It noted that, although essential for the functioning of the depicted single package embodiment, the solutions according to and the insights underlying the invention may as just as favourably be applied to a so called dual package embodiment as depicted in FIGS. 4 and 5. In this case, a definition of a T-shaped upper element part 14 defining the upper boundary of the recesses 6, may favourably become less strict, because the function of the upper boundary in the state of the art elements 5 of maintaining the structural coherence of the carrier 4 and the elements 5 in the radial direction during operation is no longer required in the belt 3 according to the invention. This allows a reduction of the axial dimension of the T-shaped upper element part 14, where the transverse extensions of the T-shape may for instance serve only to facilitate belt 3 assembly.

It is further noted that both solutions according to the invention may be applied simultaneously so that each feature thereof, i.e. the increased thickness and the critical distance, need only be dimensioned for a pre-defined amount of end play correction $E_{PC}$ being a share of the total end play $E_P$ respectively. In this respect, it is further remarked, that the size and shape of the rocking edge 9, and in particular the radial distances between the contact line and the saddle surface 8 in the two bent trajectories $B_T$ when compared with the free state shape, i.e. a circular shape of the belt 3 during manufacturing, is of influence on the total amount of end play $E_P$. Accordingly, the total amount of end play $E_P$ relevant for the above describe buckling may in practice be taken as the maximum amount of end play $E_P$ that may occur during operation of the drive belt 3 not having the features of the invention.

Based on the above described insights, the invention particularly relates to belts 3 designed according to the prescription of he following equation:

$$E_{PC} = 2 \cdot \sqrt{\tfrac{1}{4}A_V^2 + H_{SE}^2} - A_V \qquad (1)$$

Belts matching the criteria of equation 1 have the added advantage that the total end play $E_P$ may be chosen independently from a shape, a longitudinal protrusion and a location of an element's protrusion 21. Otherwise put, the current feature of the invention improves the design freedom at shaping and positioning an element's protrusion 21. In particular it need not be larger than the amount of longitudinal protrusion of circularly shaped protrusions 21 as taught by, and applied in commonly known belt types with a dual set of nested rings 7. The above criterion according to the invention may in particular be favourably applied for producing a belt 3 designed without means for limiting the radial outer movement of the carrier 4 relative to the transverse element 5, such as for instance the transverse extensions of the T-shaped upper element part 14.

According to the invention, the circumference length L of the belt 3 in practise proves to be a valuable and in automotive application sufficient indicator for the sometimes more preferred parameter indicating the centre distance $A_V$ between the shafts, i.e. the axial centres of the transmission's pulleys 1 and 2, as a result of a generally desired closest mutual orientation of pulley's. In the objective automotive applications of the belt, in particular for passenger vehicular movement application, the distance between the pulley's peripheries can be considered negligible in relation to the belt's actual circumference, i.e. generally being smaller than about 1%. In practice this means that the pulleys 1 and 2 are usually mutually positioned at the smallest radial distance possible. The end play removing ability of the height $H_{SE}$ according to equation (1) may then be translated to a design requirement for the belt 3.

According to this insight, the circumference length L of a belt may be expressed as two times that centre distance $A_V$ plus the circumference length of both belt parts within the arc-shape bent trajectories $B_T$ with the pulleys, the latter trajectory parts being determined by the radius $R_{MED}$ of the belt 3 in Medium transmission condition, i.e. transmission ratio 1, and the constant π for calculating a peripheral circular length. In equation:

$$L = 2 \cdot A_V + 2 \cdot \pi \cdot R_{MED} \quad (2)$$

The radius at which the belt 3 runs in medium $R_{MED}$ is calculated as the halfway distance between the smallest and the largest running radius of the belt 3, $R_{MIN}$ and $R_{MAX}$ respectively:

$$R_{MED} = (R_{MIN} + R_{MAX})/2 \quad (3)$$

Considering a design rule for the objected application of the belt 3, the smallest running radius of the belt 3, which is determined by the radius a pulley shaft, is about 0.2 times the pulley diameter, the latter being approximately equal to the centre distance $A_V$. At least in automotive applications where the separation between the peripheries of the pulleys 1 and 2 may be neglected, $R_{MED}$ may be rewritten as:

$$R_{MED} = (0.2 \cdot A_V + 0.5 \cdot A_V)/2 = 0.35 \cdot A_V \quad (4)$$

For the objective application resulting in following equation (5) when applied in equation (2):

$$L = 2 \cdot A_V + 2 \cdot \pi \cdot 0.35 \cdot A_V = 4.2 \cdot A_V \quad (5)$$

Applied in equation (1) the minimally required height of the upper element part, i.e. the critical radial height $H_{SE}$ for a desired amount of end play correction $E_{PC}$ thus is in accordance with the present invention related to a belt's length L by the following expression whereby smaller terms of the equation are neglected:

$$H_{SE} \approx \sqrt{E_{PC} \cdot \frac{L}{8.4}} \quad (6)$$

For maximum security and safety, element play values are according to the invention safely set at 1.5 mm for elastic deformations and 2 mm for wear effects respectively, whereas the element play value in the assembled free state of the belt 3 is taken as 1.5 mm, to which for the present calculating purpose a safety margin is set of 0.5 mm. Thus a maximum amount for the total end play $E_P$ during operation would theoretically amount to 5.5 mm. In case the total end play $E_P$ is accounted for only by means of the upper element portion critical height $H_{SE}$ and in particular not by means of the effect of the increased thickness or the effect of the distance between rocking edge 9 and saddle 8 that are discussed in the above, equation (6) learns that the required height $H_{SE}$ would amount to 0.81 times the square root of the belt's length L. In practice however, such maximum amount of total end play $E_P$ is seldom reached, most of the time a lower element play value may occur at assembly of the belt 3, while belt wear is not that excessive since a belt 3 is hardly run at infinite life time defined at over 250.000 kilometres. Further, according to the insight underlying the invention, the maximum tension is not always reached in a transmission, while also the theoretical element play measured at assembly, i.e. with the elements 5 stacked against one another over the carrier 4 such that the play is concentrated between two adjacent elements 5, is usually larger than the element play that occurs during operation when the total element play is more or less distributed between a number of pairs of adjacent elements 5. Thus in practice a much lower end play correction $E_{PC}$ amount will generally suffice than what may be expected on the basis of the theoretical maximum. However, the total end play $E_P$ is preferably taken larger than an initial element play in the belt 3 in its circular free state shape.

According to the invention, from equation (5) may it may concluded that the critical height $H_{SE}$ of the upper element part should satisfy a condition set by a factor C times the square root of the circumference length L of the belt (3), wherein C is of a value equal to or larger than 0.35 times the square root of the amount of end play ($E_{PC}$) to be removed.

In a further useful work-out, the current insight is developed as a design rule according to which the critical height $H_{SE}$ of the element 5 extending above the rocking edge 9, for attaining the effect presented by the present invention, should be set between at least 9.5 and at most 21 mm. Or still more accurately, that height $H_{SE}$ should be set between 10 mm and ending at 15 mm for belts having a circumference length L in the range starting at 350 mm and ending at 850 mm.

In yet a further useful workout, the amount of end play $E_{PC}$ to be removed is about the initial longitudinal play between the elements 5 when the belt 3 is positioned in a circular, or free state shape. According to the invention, a suitable range for the factor C in this case starts at 0.35 times 1.1 times the square root of the initial longitudinal play and ends at 0.35 times 3 times that value. This range is chosen such that it starts by including a safety factor of 0.1 to account for minor effects on the play, such as e.g. vibrations in the belt 3, and that it ends at a value taking account of considerable elastic deformations within the belt and the most severe wear that is to be expected under normal operating conditions.

In still a further useful workout, the amount of end play $E_{PC}$ to be removed is about the initial longitudinal play between the elements 5 when the belt 3 is positioned in a circular, or free state shape reduced by the amount of play that is removed in the slack trajectory part by the feature of the upper element parts having a tapered shape, as well as by the amount of play that is removed when the belt is deformed from its circular free state shape into its transmission configuration of bent and straight trajectories by the influence the shape and location of the rocking edge 9 has on the end play. Since the LOW transmission condition usually represent the condition wherein the belt 3 is the most highly loaded during operation, the invention prefers that the amounts of play to be subtracted from the initial play are determined for this transmission condition. Surprisingly, this is in contrast with the notion that both amounts of play to be subtracted are actually smallest in Medium transmission condition. However, according to the invention, the elastic deformation of the belt increasing the element play during operation is by far the largest in LOW condition and substantially surpasses the influence of the transmission condition on both amounts of play to be subtracted from the initial play.

Moreover, in case the element 5 is provided with a longitudinally extending protrusion 21 that is at least predominantly provided in the upper element part the initial longitudinal play between the elements 5 when the belt 3 is positioned in a circular, or free state shape is preferably in a range between 1 and 2 times a longitudinal amount of protrusion N1, N2 of the protrusion 21.

For ease of assembly the initial longitudinal play between the elements 5 when the belt 3 is positioned in a circular, or free state shape is at least three quarters of a largest thickness of the elements 5.

Both solutions for maintaining the integrity of the belt 3 during operation respectively described in relation to FIGS. 7 and 8, obviate the use of known locking means provided as a integral part of the element 5 for keeping together the elements 5 and the carrier 4. Such known locking means have the drawback that they might collapse when loaded during operation, which are usually difficult to manufacture and that they restrict the freedom of design of an element 5. In combination the solutions according to the invention have the advantage that the magnitude of the thickness increase of the upper element part and the magnitude of the height of the limbs 10 and 11 may be traded off against one another, thus creating a freedom of design, positively effecting the functionality and manufacturing costs of the belt 3.

Figure 9:
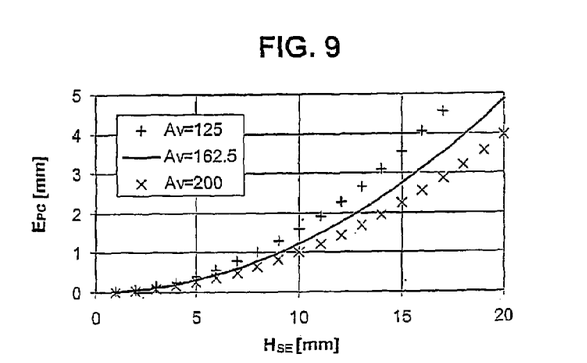
FIG. 9 is a schematic plot for several distances ($A_V$) between pulley axial centres of an end play correction ($E_{PC}$) effect against an element's critical height ($H_{SE}$) according to the invention.

FIG. 9 figuratively illustrates the relation provided by equation 1, by way of an example plot of the amount of end play correction $E_{PC}$ within the defined criterion for the distance between the rocking edge 9 and a radial outer boundary of an element 5, the critical height $H_{SE}$. Several relations therein relate to commonly applied pulley diameters, i.e. centre distances between pulley axial centres $A_V$, and are especially suitable for automotive application. For example, for a typical belt 3 a relatively large amount of say 1.2 mm of the total end play $E_P$ may be corrected, or put alternatively removed, by the critical radial height $H_{SE}$ of 10 mm that the limbs 10 and 11 extend above the rocking edge 9.

Figure 10:
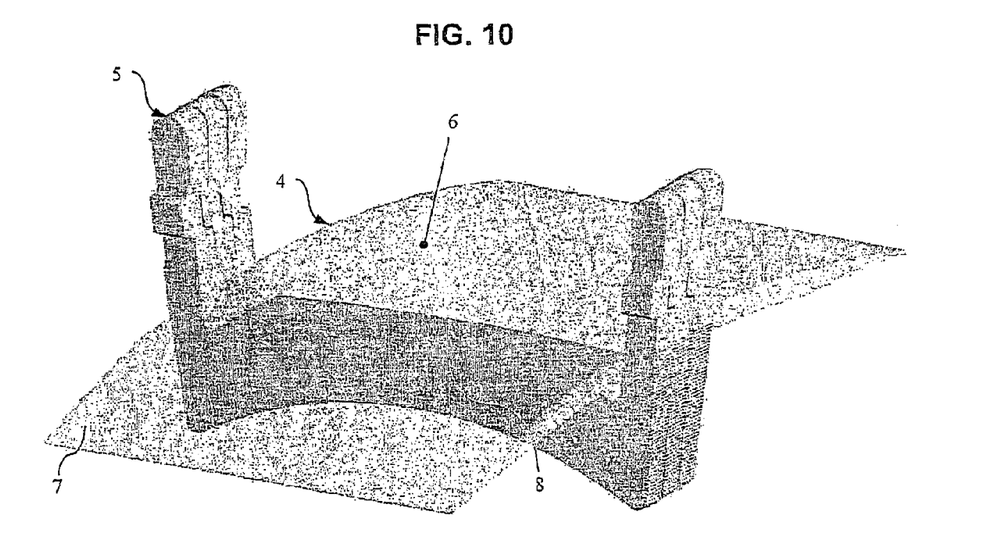
FIG. 10 is a perspective view of a belt part incorporating the element according to FIGS. 6a and 6b.

FIG. 6a and its perspective representation in the belt section of FIG. 10 depict an embodiment according to the invention showing several further independent aspects of the current invention.

First of all, it is noted that the single package design with its limbs 10, 11 forming an axial boundary for a transverse movement of the carrier 4 differs from the double package design where transverse movement of the carrier 4 to one side is not bound by the element 5, but by the pulleys 1, 2. This difference allows the elements 5 of the double package design to be positioned such between the sheaves of a pulley 1 or 2 that the carrier 4 is located at least partly radially outward from the pulley 1, 2, while the flanks 15 and 16 are still partly located between the sheaves of the pulley. Consequently, with the same pulley design, a range of transmission ratios—a transmission ratio being the quotient of the running radii of the bent trajectory parts $B_T$ in the pulleys 1 and 2—that can be realised with a belt 3 of given length L may be larger with the single package belt design than with the double package design. This is considered highly desirable, since in the same building space the functionality of the transmission is improved. Underlying this feature of the single package belt 3 is the insight that, although in the condition where the carrier 4 is located radially outside the pulley 1, 2, also the flanks 15 and 16 are partly located radially outside the pulley 1, 2 thereby increasing the pressure thereon, this may according to the invention be allowed because it only occurs at the bent trajectory part $B_T$ having the largest running radius where the number of elements 5 between the sheaves of the pulley 1, 2 and thus also the total surface area available for taking up the forces is relatively large anyway.

The elements 5 according to the invention are shown to be relatively thin, i.e. between 1.5 mm and 3.0 mm, and to have a lower element part with a inclined face 19 extending between the rocking edge 9 and a inner edge 24 of the element as seen in the radial direction of the belt 3. The thickness of the lower element part as seen in side elevation declines towards its inner edge 24, so as to allow the belt 3 to be bent when passing a arc-like bent trajectory $B_T$ in the pulleys 1 and 2. Due to an operational tension within the radially stacked set of rings 7, the carrier 4, and at least the part thereof passing a bent trajectory $B_T$, is depicted and considered to be forced in contact with the saddle surface 8 of the element 5. The inner edge 24 is curved concave such that a minimal radial height of the lower element part is attained near the centre of the element 5 as viewed in the axial direction of the belt 3. The inclined face 19 may continue towards and merge with the inner edge 24, however, in a favourable light weight embodiment of the element 5, the inclined face 19 adjoins a recessed part 23 through a step 22 in the longitudinal direction of the belt 3. In FIG. 6 the depth of the step 22 has been exaggerated for clearly showing the details thereof. In fact the step 22 has a depth dimension ranging between 1/12 and 3/12 of the thickness of the element 5 just above the rocking edge 9. In a preferred embodiment of the element not depicted here, the step 22 virtually adjoins the rocking edge 9 in which case inclined face 19 is absent. In this manner, especially when the recess part 23 is realised in a manufacturing step or process preceding that of shaping the rocking edge 9, the element 5 may be produced more accurately, because less effort is needed in blanking the element 5 from a plate or strip, due to the reduced surface area of the cutting edges. A functional reason for providing the step 22 is to allow the flanks 15 and 16 to be of considerable height, i.e. length in the radial direction of the belt 3, for optimum contact with a pulley 1, 2, while still fulfilling the requirement of low weight of the element 5. For assuring adequate contact, the depth of the step 22 should not exceed ½ of the thickness of the element 5 just above the rocking edge 9. The inner edge 24 at the location where it is closest to the saddle 8 is designed to join, or at least end close to the step 22, possibly even intersecting it. Preferable the inner edge 24 intersects the step 22 in a single point as shown in FIGS. 6a and 6b. The inner edge 24 may be shaped as a concave curvature starting and ending respectively in the immediate vicinity of a radially innermost element portion, e.g. such that it virtually merges with the flanks 15 and 16 by a rounding of small radius, e.g. of 0.3 mm. It may be allowed that such concave curvature is interrupted by the step 22 intersecting it, but the depth of the curvature in the radial direction should preferably at least extend up to 1/6 the width of the element 5 in the axial direction of the belt 3 just above the rocking edge 9. Preferably, the concave curvature is arc shaped or is composed of several adjoining arcs as the case may, such arc or arcs having a radius of curvature within a range between 0.5 and 1 of the width of the lower element part. In this manner, forces acting on lower parts of the contact faces 15 and 16 are favourably transferred to the element 5.

In an embodiment according to the invention the element 5 is further provided with at least one protrusion 21 protruding longitudinally from the front face 20. The protrusion 21 is provided in the radially outer half of the front face 20. At the further longitudinally facing face of the element 5 longitudinal opposite to the front face 20, such protrusion 21 goes along with a hole 27, i.e. a recessed element part that is shaped more or less conforming to the protrusion 21. In the embodiments shown, protrusions 21 are provided in each of the limbs 10 and 11 and are shaped more or less rectangular extending in a predominantly axially oriented direction. Preferably, the largest dimension of the protrusions 21 in the radial direction substantially corresponds to the thickness of the element 5 just above the rocking edge 9. In a preferred embodiment, an axially facing side face of the limbs 10 and 11 predominantly extends substantially parallel to the flanks 15 and 16, thereby facilitating both operational stability of the belt 3 and the assembly thereof. The protrusions 21, alternatively denoted longitudinal projections 21, in the current design serve as a backup safety for preventing the elements 5 to separate from the carrier 4 when in the slack trajectory part or when the belt 3 should somehow not be tensioned in the absence of the clamping force. However, a basic clamping force is usually provided by means of a spring acting on the movable sheave of at least one of the pulley 1 or 2. For this reason, preferably the initial element play after assembly of the current belt design is set at twice the longitudinal protruding length of a protrusion part 21.

Figure 11:
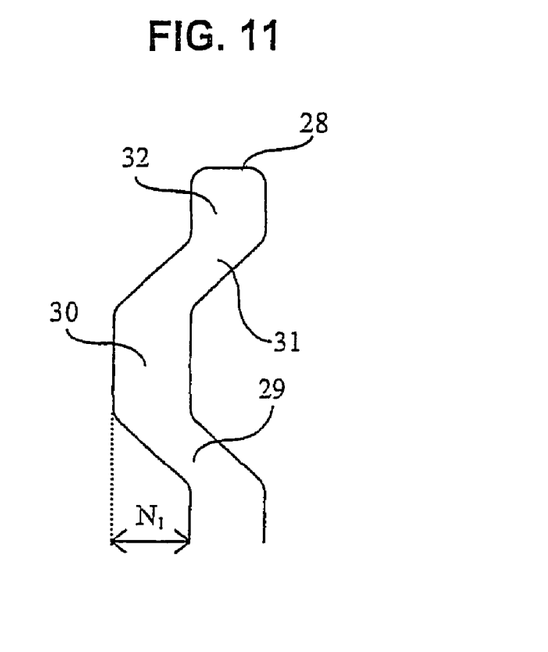
Figure 12:
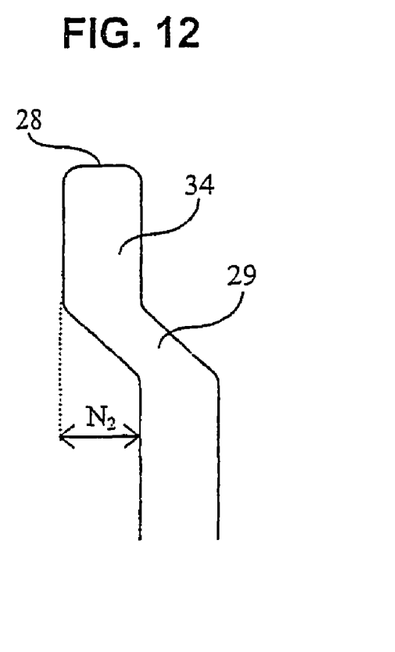

In a preferred embodiment of the invention the protrusions 21 are shaped in accordance with one of the FIGS. 11 and 12. FIGS. 11 and 12 each represent an upper section of the side elevation of FIG. 6a. Rather than being shaped by blanking, the protrusions 21 may favourably be produced by bending of the limbs 10 and 11. This has the advantage that the longitudinal thickness and therewith the strength of a limb 10, 11 may be maintained throughout its radial height. In the embodiment according to FIG. 11, the protrusion 21 is embodied by three limb parts 29, 30 and 31 of conforming if not equal thickness. The amount of longitudinal protrusion $N_1$ may by this design be considerably increased with regard to the protrusion 21 intended to interact with hole 27. In the embodiment of FIG. 11 the radial dimension of the limb parts 29, 30 and 31 is limited by the length of a limb 10, 11, but on the other hand may be as thick as the limb 10, 11, which is considerably thicker than the protrusion 21 intended to interact with hole 27 of the side elevation of FIG. 6a. In the embodiment of FIG. 12 the amount of longitudinal protrusion of the limb parts 29 and 34 matches the local thickness of the element 5. According to the invention, however, the amount of longitudinal protrusion may be in principle being made as large as twice the thickness of the element 5 at the location of limb part 29. In the design according to FIG. 12 the amount of protrusion $N_2$ may favourably be made larger than $N_1$ because the limb part 31 folded rearward that uses some of the available radial length of a limb 10, 11 is omitted. In both designs the limb part 29 comprises axially and longitudinally upward extending surfaces that face either to the front or to the back of the element 5. By the front of the element is meant the side of the element 5 where the rocking edge 9 is located. Another advantage of the embodiment of FIG. 12 is that the radially outer limb part 34 may be produced relatively long more easily.

The relative large amounts of longitudinal protrusion $N_1$ and $N_2$ of the limb parts 29, 30, 31 and 29, 34 positively influence both the maintenance of the integrity, or coherence of the belt 3 while in operation and the capability and easy of the belt of exiting a pulley 1, 2. Preferably the limb parts 29 and 31 extend under an angle larger than or conforming to 45 degrees, more preferably within a range between 50 and 60 degrees relative to the longitudinal direction of the belt 3.

In the embodiment according to the invention the flanks 15 and 16 extend from near the radially innermost part of the element to well above the saddle surface 8 and preferably up to, or even beyond the carrier 4 at least when contacting the saddle surface 8. Preferably the flanks 15 and 16 extend for at least one third more preferably for at least half of their radial length above the rocking edge 9. In a specific embodiment according to the invention, the flanks 15 ad 16 extend for one fifth of their entire radial length above the carrier 4. The entire radial length of the flanks 15 and 16 conforms to at least approximately half of the radial height of the element 5. In this way it may be achieved that a moment realised by forces acting on the element 5 in a bent trajectory BT, as for instance described in mentioned in JP 2000/213609, is reduced to a level too small to effect tilting of the element 5 about an axial of the belt 3. In particular, an effective force resulting from friction between a pulley 1, 2 and the element 5, a relatively less intense friction force between the saddle surface 8 and the carrier 4 and a pushing force exerted through the rocking edge 9 between adjacent elements 5 influence the moment. Such tilting is accompanied by slip between the element 5 and the pulley 1, 2, thereby adversely affecting the efficiency of the transmission. The tendency of the element 5 to tilt about an axial of the belt 3 so that it is no longer oriented substantially radially while being clamped in a pulley 1, 2, is significantly reduced by the current measure according to the invention. Therewith the efficiency with which torque is transmitted by the belt 3 is advantageously increased, without the need for the rocking edge 9 being located at a considerable radial distance from the saddle surface 8, which would be required for the known element designs of FIGS. 2 to 5 and which would adversely effect the functioning of the belt 3 by increasing the relative speed between carrier 4 and elements 5 as for instance described in JP 01/098733.

The design of the flanks 15, 16 according to the invention further effects that its radial length is advantageously increased, which is in particular advantageous in a belt part that is most tightly bent during operation, usually being the arc-like bent trajectory having smallest running radius (corresponding to $R_{MIN}$) when the belt 3 is in a state conforming to the so called Low transmission condition. In this condition and location, usually the friction forces and the clamping force are the largest during operation, whereas the number of elements 5 in the pulley 1, 2 available for taking up such forces is smallest. Moreover, the arc-like shaped inner edge 24 allows the flanks 15 and 16 to be of considerable radial length and to stretch considerably below the level of the rocking edge 9, while the forces are favourably taken up by and distributed over the bulk of the element 5. The total length of a flank 15, 16 is at least twice, but preferably at most five times, the height of the smallest radial dimension of the element 5 between the saddle surface 8 and the inner edge 24. Such range provides for optimal receiving of the pinching force, while still providing sufficient strength to the element 5.

The relatively large radial length of the flanks 15 and 16 further effects a reduced contact pressure in the contact between element 5 and pulley 1, 2 at an otherwise constant clamping force. Although the stress associated with such contact pressure, usually denoted as Hertzian contact stress, is generally not considered critical for mechanical strength of either the element 5 or the pulley 1, 2, as may be taken from the given material characteristics and theoretical analysis, indeed the pressures prevailing in the contact effects the performance of many types of hydraulic fluid. In particular, local disintegration of a cooling and/or greasing medium may be prevented when the amount of locally dissipated heat is kept low, or, alternatively put, when the contact pressure is kept low, i.e. is reduced compared to what is known from the prior art. The maintaining of low Hertzian contact stress in the contact between pulley 1, 2 and element 5 is according to the invention of high practical importance, because the disintegration of the cooling medium may quickly be followed by loss of functionality of the transmission.

FIG. 6a further shows the limbs 10 and 11 having end parts where their axial width slightly increases in radial outward direction. The end parts are provided with a radial top side that is formed by an at least partly curved plane 28 extending from one axial limb side to the opposite axial limb side and starting at the widest section 26 of the limb 10. The curved plane 28 is preferably at least partly curved with a radius of curvature in the order of half of the longitudinal thickness of the element 5 at the location of the rocking edge 9. The preferred embodiment further shows a central, flat plane part extending axially and longitudinally. The increasing axial width of the limbs 10 and 11 at the location of their end parts allows a stable mutual support of the elements 5, while the belt 3 passes the inwardly curved slack trajectory part. Such widening is preferably attained with the axial inner side of a limb 10, 11, i.e. the side that faces the recess 6, extending radially, i.e. at least virtually perpendicular to the axial and longitudinal directions of the belt 3. Alternatively, e.g. when the axial outer side of the end part of the limb 10, 11 facing the pulley 1, 2 predominantly extends radially as indicated in FIG. 13, the widening may be attained with a part of the axial inner side being oriented away form the axial outer side.

Figure 13:
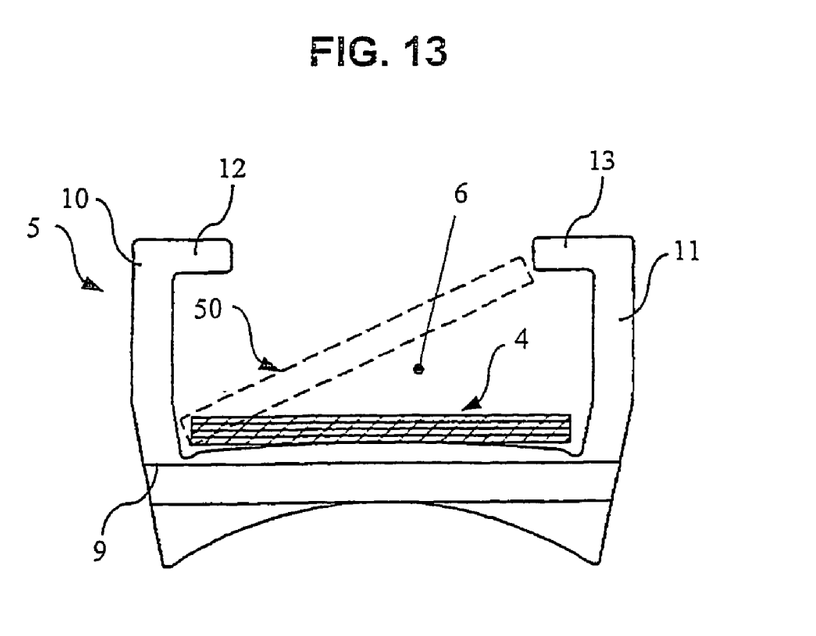
FIG. 13 is a schematic illustration of an element embodiment falling within the scope of the present invention.

FIG. 13 schematically illustrates an embodiment of the element 5 of the present invention. Square 50 indicates how the carrier 4 may be received by the recess 6 of the element 5 at assembly of the belt 3 without. In contrast with the state or the art element design as shown in FIG. 2, the hook shaped end parts 12 and 13 of the limbs 10 and 11 do not serve, or in fact because of their limited size can not serve, to lock the carrier 4 and element 5 together during operation, but to increase a surface area available for contact between adjacent elements 5 and to aid in maintaining the belt's 3 coherence when it is not operation. With this it meant that, although the hook parts 12 and 13 are not large enough to effectively lock the carrier 4 in the recess 6, as is the case in the state of art element 5, they do inhibit the carrier 4 from leaving the recess 6 when oriented substantially parallel to the axial direction.

With the respective design features according to the invention described in the preceding, taken individually or in combination, the reduction of an elements weight is realised and/or supported, which reduction favours the torque transmitting capacity of the belt 3 during operation in a transmission, positively effecting its cost price and/or technical performance. The invention is not limited to the matter according to the following claims but includes all features as disclosed by the drawings and the description pertaining thereto.

The invention claimed is:

1. Belt (3) for use in a continuous variable transmission, comprising:
    an endless carrier (4) for taking up tensile forces within said belt (3), and
    a plurality of transverse elements (5) provided moveable in the longitudinal direction along said carrier (4),
    which elements (5) are provided with at least one saddle surface (8) for contacting the carrier (4),
    which saddle surface (8) defines an ultimate mutual position of said carrier (4) and said elements (5) relative to each other within the belt (3) in radial direction,
    each element comprising a tapered lower element part including a rocking edge (9) and with an upper element part (10, 11; 14) extending radially beyond the carrier (4), at least when the carrier (4) and the saddle surface (8) are in mutual contact,
    characterized in that, a thickness of the upper element part (10, 11; 14) of a majority of the transverse elements (5) is notionally larger than a largest thickness of the tapered lower element part, and
    in that the upper element part in the majority of the transverse elements (5), above the rocking edge (9), has a thickest part near a radial outer end relative to a thickness of the upper element at or near the rocking edge (9),
    such that an array of the majority of the transverse elements (5) being pushed against one another within said belt (3), when mutually contacting through their upper element parts (10, 11; 14), assumes an arc shape as seen in an axial side elevation.

2. Belt (3) according to claim 1, characterised in that as seen in side elevation the thickness of the upper element part (10, 11; 14) of said majority of the transverse elements (5) gradually increases from the rocking edge (9) in radially outward direction.

3. Belt (3) according to claim 2, characterised in that at least one longitudinally facing side face of the upper element part (10, 11; 14) of said majority of the transverse elements (5) forms a flat plane with at least one longitudinally facing side face of the respective lower element part.

4. Belt (3) according to claim 1, characterised in that at least one longitudinally facing side face of the upper element part (10, 11; 14) of said majority of the transverse elements (5) forms a flat plane with at least one longitudinally facing side face of the respective lower element part.

5. Belt (3) according to claim 1, characterised in that a nominal thickness of the upper element part (10, 11; 14) of said majority of the transverse elements (5) is between 1.01 and 1.20 times the largest thickness of the respective lower element part.

6. Belt (3) according to claim 1, characterised in that by an adaptation of a critical radial height $H_{SE}$ of the upper element part (10, 11; 14) of at least a majority of the elements (5) of the belt (3) in relation to a circumference length L of the belt (3) an amount of play ($E_{PC}$) present between the transverse elements (5) is removed, at least would be when mounted and run in a transmission by mutual contact between the upper element parts (10, 11; 14) of at least two transverse elements (5) in a concavely shaped slack trajectory part of the belt (3) in between the pulleys (1, 2).

7. Belt according to claim 6, characterised in that the critical radial height $H_{SE}$ of the upper element part (10, 11; 14) satisfies a condition set by a factor C times the square root of the circumference length L of the belt (3), wherein C is of a value equal to or larger than 0.35 times the square root of the amount of end play ($E_{PC}$) to be removed.

8. Belt according to claim 1, characterised in that said majority of the transverse elements (5) are each provided with two limbs (10 and 11) extending from the rocking edge (9) in radially outward direction and defining lateral boundaries of a carrier receiving recess (6), whereby said saddle surface (8) is located between the limbs (10 and 11).

9. Belt (3) according to claim 1, characterised in that a nominal thickness of the upper element part (10, 11; 14) of said majority of the transverse elements (5) is 1.04 times the largest thickness of the respective lower element part.

10. Continuous variable transmission belt (3), comprising:
   an endless carrier (4) for taking up tensile forces within said belt (3) and, in operation between two pulleys, having an upper pushing crossing trajectory between the two pulleys; and
   a plurality of transverse elements (5) having a tapered lower element part and an upper element part,
   said elements provided moveable in a longitudinal direction along said carrier,
   said elements provided with a saddle surface (8) contacting the carrier, said saddle surface defining a mutual position of said carrier and said elements relative to each other within the belt in a radial direction,
   the upper element extending radially beyond the carrier,
   the lower element part having a rocking edge (9), the rocking edge having a beginning edge and an ending edge so that the lower element part terminates with the ending edge,
   the upper element (10) part extending from ending edge of said rocking edge and terminating with a radial outer end,
   the upper element having a first thickness, in a longitudinal direction of the belt, at or near the ending edge of said rocking edge and a greater second thickness, in the longitudinal direction of the belt, at or near the radial outer end, wherein,
   a thickness of the upper element part, in the longitudinal direction of the belt, is notionally larger than a largest thickness of the tapered lower element part, and
   the upper element part has a thickest part near the radial outer end relative to the first thickness, such that an array of the elements being pushed against one another within said belt, when mutually contacting through their upper element parts, form a convex arc shape, as seen in an axial side elevation, at the upper pushing crossing trajectory between the two pulleys.

11. The belt of claim 10, wherein, the first thickness is at the ending edge of said rocking edge and the greater second thickness is at the radial outer end, the second thickness being the thickest part of the upper element.

12. Continuous variable transmission belt (3), comprising:
   an endless carrier (4) taking up tensile forces within said belt (3) and, in operation between two pulleys, having an upper pushing crossing trajectory between the two pulleys; and
   a plurality of transverse elements (5) having a tapered lower element part with a rocking edge (9) and an upper element (10) part extending from said rocking edge,
   said elements provided moveable in a longitudinal direction along said carrier,
   said elements provided with a saddle surface (8) contacting the carrier, said saddle surface defining an ultimate mutual position of said carrier and said elements relative to each other within the belt in a radial direction,
   the upper element extending radially beyond the carrier, wherein,
   a thickness of the upper element part, in a longitudinal direction of the belt, is notionally larger than a largest thickness of the tapered lower element part, and
   the upper element part has a thickest part near a radial outer end relative to a thickness of the upper element part at or near the rocking edge, such that an array of the elements being pushed against one another within said belt, when mutually contacting through their upper element parts, form an arc as seen in an axial side elevation convexly shaped in the upper pushing crossing trajectory between the two pulleys.

13. The belt of claim 12, wherein, the thickest part of the upper element is at the radial outer end.

* * * * *